US009361717B2

(12) United States Patent
Zomet (10) Patent No.: US 9,361,717 B2
(45) Date of Patent: Jun. 7, 2016

(54) METHODS AND SYSTEMS OF GENERATING AN INTERLACED COMPOSITE IMAGE (75) Inventor: Assaf Zomet, Jerusalem (IL)

(73) Assignee: HumanEyes Technologies Ltd., Jerusalem (IL)

(*) Notice: Subject to any disclaimer, the term of this patent is extended or adjusted under 35 U.S.C. 154(b) by 484 days.

(21) Appl. No.: 13/880,099

(22) PCT Filed: Oct. 19, 2011

(86) PCT No.: PCT/IB2011/054653
§ 371 (c)(1),
(2), (4) Date: Apr. 18, 2013

(87) PCT Pub. No.: WO2012/052936
PCT Pub. Date: Apr. 26, 2012

(65) Prior Publication Data
US 2013/0216128 A1   Aug. 22, 2013

Related U.S. Application Data (60) Provisional application No. 61/394,365, filed on Oct. 19, 2010.

(51) Int. Cl.
G06T 11/60       (2006.01)
H04N 1/387      (2006.01)
H04N 13/04      (2006.01)

(52) U.S. Cl.
CPC .............. *G06T 11/60* (2013.01); *H04N 1/387* (2013.01); *H04N 13/0404* (2013.01)

(58) Field of Classification Search
None
See application file for complete search history.

(56) References Cited

U.S. PATENT DOCUMENTS

| 5,717,522 A * | 2/1998 | Hattori .................. G02B 27/26 348/58 |
| 2010/0066817 A1 | 3/2010 | Zomet et al. |
| 2010/0246019 A1 | 9/2010 | Booyens et al. |
| 2011/0222559 A1* | 9/2011 | Ishii ....................... G09G 3/003 370/498 |
| 2013/0293576 A1* | 11/2013 | Zomet ................ H04N 13/0007 345/629 |

FOREIGN PATENT DOCUMENTS

| GB | 2303259 | 6/1997 | |
| IL | WO 2008102366 A2 * | 8/2008 | ......... H04N 13/0404 |
| IL | WO 2009013744 A2 * | 1/2009 | ......... G02B 27/2214 |

(Continued)

OTHER PUBLICATIONS

International Preliminary Report on Patentability Dated May 2, 2013 From the International Bureau of WIPO Re. Application No. PCT/IB2011/054653.

(Continued)

*Primary Examiner* — Bernard Krasnic (57) ABSTRACT

According to some embodiments, there is provided a method of creating an interlaced composite image. The method comprises receiving a plurality of images selected for interlacing, generating an interlaced composite image by interlacing a plurality of image strips from each the image and a plurality of separating strips in alternating manner, and outputting the interlaced composite image. At least some of pixel color values of each of the plurality of separating strips are calculated as a function of respective pixel color values of each of a first and second of the plurality of image strips which are interlaced to its left and to its right in the interlaced composite image.

15 Claims, 5 Drawing Sheets

(56) References Cited

FOREIGN PATENT DOCUMENTS

| WO | WO 2010/016061 | 2/2010 |
| WO | WO 2012/052936 | 4/2012 |

OTHER PUBLICATIONS

Communication Pursuant to Article 94(3) EPC Dated Aug. 7, 2014 From the European Patent Office Re. Application No. 11790670.1.
Communication Pursuant to Article 94(3) EPC Dated Jan. 30, 2014 From the European Patent Office Re. Application No. 11790670.1.
Communication Pursuant to Article 94(3) EPC Dated May 6, 2015 From the European Patent Office Re. Application No. 11790670.1.
International Search Report and the Written Opinion Dated Feb. 22, 2012 From the International Searching Authority Re. Application No. PCT/IB2011/054653.
Notice of Reason for Rejection Dated Jul. 24, 2015 From the Japanese Patent Office Re. Application No. 2013-534439 and Its Translation Into English.

* cited by examiner

METHODS AND SYSTEMS OF GENERATING AN INTERLACED COMPOSITE IMAGE

RELATED APPLICATION APPLICATIONS

This application is a National Phase of PCT Patent Application No. PCT/IB2011/054653 having International filing date of Oct. 19, 2011, which claims the benefit of priority under 35 USC §119(e) of U.S. Provisional Patent Application No. 61/394,365, filed on Oct. 19, 2010. The contents of the above applications are all incorporated by reference as if fully set forth herein in their entirety.

FIELD AND BACKGROUND OF THE INVENTION

The present invention, in some embodiments thereof, relates to lenticular printing and, more particularly, but not exclusively, to an apparatus and a method for enhancing lenticular printing and displays.

Lenticular printing is a process consisting of creating a composite interlaced composite image by interlacing various images, and attaching it with a lenticular lens arrangement, such as a sheet, to form a lenticular image article. When digitally processing the composite interlaced composite image, various images are collected are flattened into individual, different frame files, and then digitally combined by interlacing into a single final file in a process which may be referred to herein as interlacing. The lenticular printing can be used to create a dynamic image, for example by offsetting the various layers at different increments in order to give a three dimension (3D) effect to the observer, various frames of animation that gives a motion effect to the observer, a set of alternate images that each appears to the observer as transforming into another. One of the most common methods of lenticular printing, which accounts for the vast majority of lenticular images in the world today, is lithographic printing of the composite interlaced composite image directly onto lower surface of a lenticular lens sheet.

Over the past several years various commercial lenticular software products have become available, and these programs all tend to address the creation of interlaced lenticular files. Existing lenticular printing processes introduce a host of problems in the form of moire, banding, checkerboard patterning, ghosting, and blurry images.

Few methods and systems have been developed to overcome these problems. For example, International Application Publication No. WO/2010/016061 describes a method for preparing an article of lenticular imaging. The method comprises receiving a plurality of source images, superimposing at least one deghosting element on the plurality of source images, the deghosting element being formed to reduce an estimated ghosting artifact from the article, interlacing the plurality of processed source images so as to form a spatially multiplexed image, and preparing the article by attaching an optical element to the spatially multiplexed image.

Another example is described in US Patent Publication number 2010/0066817 which describes a method for identifying a blur profile of a multi image display with a first image separating mask. The method comprises displaying a calibration pattern through a second image separating mask, allowing an evaluator to provide a visual estimation indicating a blur brought about to the calibration pattern by the second image separating mask, and generating a blur profile of at least the first image separating mask according to the visual estimation. The first and second image separating masks having a substantially similar optical profile.

SUMMARY OF THE INVENTION

According to some embodiments of the present invention, there are provided a method of creating an interlaced composite image for. The method comprises receiving a plurality of images selected for interlacing, generating an interlaced composite image by interlacing a plurality of image strips from each the image and a plurality of separating strips in alternating manner, and outputting the interlaced composite image. At least some of pixel color values of each of the plurality of separating strips are calculated as a function of respective pixel color values of each of a first and second of the plurality of image strips which are interlaced to its left and to its right in the interlaced composite image.

Optionally, the receiving further comprises enhancing the pixel value of at least some of each of the plurality of images.

Optionally, the generating comprises creating a reverse intensity image wherein respective pixel color values of the pair of image strips are combined, and extracting the plurality of separating strips from the reverse intensity image.

More optionally, the reverse intensity image depicts bright color objects of the first image as dark objects and dark color objects depicted in the first image as light color objects.

More optionally, the reverse intensity image depicts objects depicted in the first of the plurality of images as a semi transparent overlay which is placed on top of a second of the plurality of images.

More optionally, the pair of image strips are combined by subtracting a pixel value of each pixel in at least a portion of a first of the plurality of images from an enhanced pixel value of a respective pixel in a respective portion of a second from the plurality of images.

Optionally, the plurality of images comprises first and second images and the function comprises subtracting at least a portion of a pixel value of each pixel in at least a portion of a first image from a color enhanced pixel value of each pixel in a respective portion of a second image.

Optionally, the outputting comprises attaching the interlaced composite image to a lenticular lens sheet having a plurality of lenslets.

More optionally, the width of the plurality of lenslets with the plurality of separating strips and the plurality of image strips.

Optionally, the plurality of images is a video sequence and the outputting is performed in real time for three dimensional display of the video sequence.

Optionally, the interlaced composite image is projected on a lenticular mask for three dimensional display of content depicted in the plurality of images.

Optionally, the outputting comprises at least one of printing the interlaced composite image and projecting the interlaced composite image on an image separating mask.

More optionally, the ratio between a space allocated for the plurality of separating strips and a space allocated for the plurality of image strips is adapted to a ratio between an interlacing resolution and a pitch of the image separating mask.

Optionally, each the image is taken from a region of a source image, the outputting comprises embedding the interlaced composite image in the region.

According to some embodiments of the present invention, there are provided a lenticular imaging article with a reduced banding artifact. The lenticular imaging article comprises a lenticular lens sheet having a plurality of lenslets and an interlaced composite image having a plurality of image strips from each of a plurality of images and a plurality of separating strips interlaced therebetween. At least some of pixel color values of each of the plurality of separating strips are a function of respective pixel color values of each of a first and second of the plurality of image strips which are interlaced to its left and to its right in the interlaced composite image.

According to some embodiments of the present invention, there are provided a system of creating an interlaced composite image. The system comprises a processor, an input unit which receives a plurality of images selected for interlacing, an interlacing module which generates an interlaced composite image by interlacing a plurality of image strips from each the image and a plurality of separating strips in alternating manner, and an outputting unit which outputs the interlaced composite image. At least some of pixel color values of each of the plurality of separating strips are calculated as a function of respective pixel color values of each of a first and second of the plurality of image strips which are interlaced to its left and to its right in the interlaced composite image.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

The present invention, in some embodiments thereof, relates to lenticular printing and, more particularly, but not exclusively, to an apparatus and a method for enhancing lenticular printing.

According to some embodiments of the present invention, there are provided systems and methods creating an interlaced composite image by interlacing alternately image strips from each of a number of source images and separating strips which are generated as a function thereof. The separating strips of the interlaced composite image allow creating a lenticular article or a 3D display with a reduced ghosting artifact or no ghosting artifact. Optionally, a pixel color value of a pixel of the separating strip is calculated by a subtraction of a pixel color value of a respective pixel from one source image from a pixel color value of a respective pixel from another source image. For brevity, the term pixel color value covers any portion of a pixel color value.

A method according to some embodiments is based on a plurality of images selected for interlacing, for example images selected to appear in a flip optical illusion, a movement optical illusion, and/or in a 3D display. An interlaced composite image is created by interlacing a plurality of image strips from each of the plurality of images and a plurality of separating strips in alternating manner. Some of the pixel color values of each of the separating strips are calculated as a function of respective pixel color values of each of a pair of the image strips, optionally adjacent, located on its sides, for example one to its left and another to its right.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
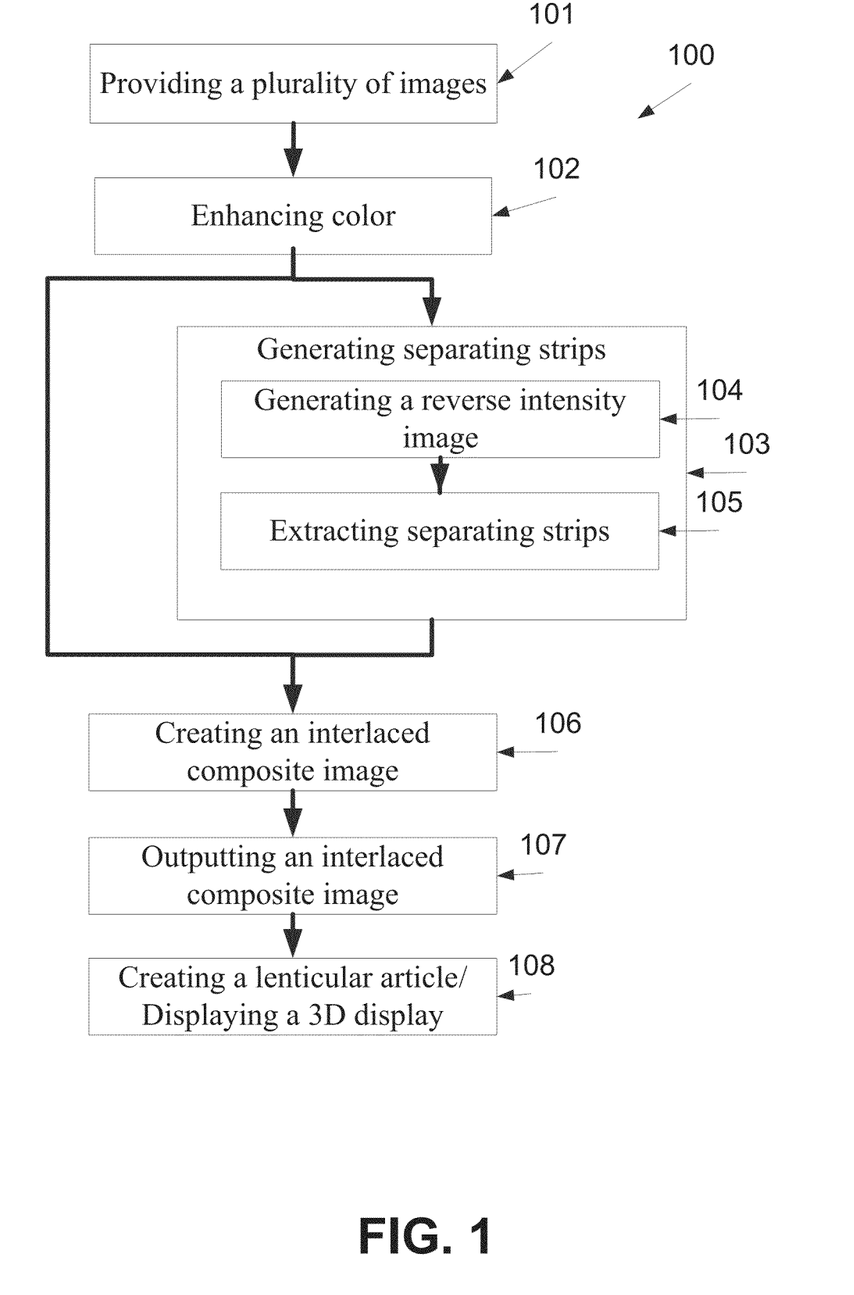
FIG. 1 is a schematic illustration of a method of creating an interlaced composite image for a lenticular imaging article having a reduced ghosting effect, according to some embodiments of the present invention.

Reference is now made to FIG. 1, which is a schematic illustration of a method 100 of creating an interlaced composite image for a lenticular imaging article having a reduced ghosting artifact, according to some embodiments of the present invention. The method may be implemented by a printing machine, a network node, such as a server, a module executed on a client terminal, such as a laptop, a tablet, a desktop and/or the like. The method may be to reduce the ghosting artifact, also referred to herein as a ghosting effect, effect in a three dimensional display of a video sequence by creating separating strips which are interlaced with image strips of taken from frames of a video sequence, referred to herein as images.

The method is optionally stored as instructions on a computer-readable medium such as a floppy disk, a CD or disk-on-key, containing a set of instructions as a software application for creating an image interlace of a set of images, and/or the like.

First, as shown at 101, a plurality of images, for example 2, 3, 4, 5 or a larger number of images, are received. The images may be extracted, optionally automatically, from a sequence, such as a typical spatial-temporal signal for example a series of sequentially ordered images, a video sequence, or any other series of sequential images. In such an embodiment, the method may be executed to reduce the ghosting effect of a three dimension (3D) video display. The images may be selected to create a dynamic image, for example a set of offset images selected to give 3D effect to the observer, when interlaced, various frames of one or more moving objects that gives a motion effect to the observer, when interlaced, and/or a set of alternate images that are selected to appear, when interlaced, to the observer as transforming into another. The images may be extracted from a memory device, captured by an imaging device, received from a remote server, selected by a user, and/or created by a user.

Optionally, as shown at 102, the color of the received image is enhanced. The color enhancement increases a deviation between pixel color values and mid-range values, for example, if the pixel value is a 3 channel 8-bit pixel value and the mid-range value is (128,128,128). In some embodiments, color enhancement is implemented as follows:

nChannels=size(im,3);
correctionIm=colorCorrect*(im−0.5);
boundUp=max(correctionIm./(1−im),[ ],3);
boundDown=max(−correctionIm./(im+1e−10), [ ],3);
bound=max(boundUp, boundDown);
scale=min(ones(size(bound))./(bound+1e−10),ones(size(bound)));
scaleImg=zeros(size(correctionIm));
for g=1:nChannels,
  scaleImg(:,:,g)=scale;
end
imOut=im+scaleImg.*correctionIm;
imOut(imOut<0.1)=0.1;
imOut(imOut>1)=1;

where im denoted a color correct percentage value and the pixel color values are assumed to be between 0 and 1.

Now, as shown at 103, a plurality of separating strips, which are based on pixel color values of the received images, are generated. Optionally, as shown at 104, one or more reverse intensity images are created and used. Each reverse intensity image has pixel color values set according to a function of the pixel color values. For example, FIGS. 2A-2C and similarly FIGS. 3A-3C, respectively depict two exemplary received images and a reverse intensity image which is created therefrom.

As shown at 105, the separating strips are optionally extracted from the reverse intensity image(s). It should be noted that the plurality of separating strips may be created by replacing pixel color values of strips in the interlaced composite image with color corrected pixel color values and/or separating strips pixel color values which are calculated as outlined above and described below.

Now, as shown at 106, an interlaced composite image is created by interlacing a plurality of image strips from each one of the received images with the separating stripes.

After the interlacing thereof, the separating stripes are designed to reduce visible ghosting in the lenticular article by providing a separation between the displayed views.

Optionally, the interlacing is performed so that each separating strip is placed between strips from which pixel color values have been extracted for the creation thereof, optionally in adjustment to an inverse version thereof. For example, if a plurality of image strips $A_1 \ldots A_n$ from image are interlaced with a plurality of image strips $B_1 \ldots B_n$ of image B, a first group of separating strips which are created according to the following function: $C_{xy}=f(A_x, B_y)$ and a second group of separating strips which are created according to the following function: $D_{xy}=f(B_x, A_y)$, are arranged to form an interlaced composite image as follows $A_1, C_{11}, D_{11}, B_1, D_{12}, C_{21}, A_2, C_{22}, D_{22}, B_2, D_{23} \ldots C_n, A_n, C_n, D_n, B_n, D_n$.

Then, as shown at 107, the interlaced composite image is outputted, for example to a printer, for instance a lenticular articles printer and/or projected, for example for a 3D display. As shown at 108, this allows printing the interlaced composite image on a lenticular lens sheet and/or on an image paper and/or a sticker, which is designed to be attached to a lenticular lens sheet.

Optionally, the forming of the interlaced composite image involves assigning brightness intensities or colors, to a set of positions on the reference grid.

Optionally, the printed interlaced composite image is printed on or attached to an image separating mask, such as a lenticular lens sheet, which is optionally adapted to the width of the strips of the interlaced composite images and/or to the width of the separating strips, is provided. As used herein, a lenticular lens sheet and an image separating mask may be referred to interchangeably and intend to describe, inter alia, articles such as an array of lenslets, optionally magnifying, optionally cylindrical, designed so that when viewed from a point of view in slightly different angles, light from different segments of a plane parallel to the sheet is directed to the point of view. The lenticular lens sheet has a plurality of parallel lenticular lines each separates between two lenslets of the lenticular lens sheet. The parallel lenticular lines and the lenslets are optionally parallel to a common axis.

Optionally, a calibration process is used for calculating one or more color calibration (i.e. see colorCorrect in the exemplary color enhancement above) and/or separating strop parameters (i.e. α as defined below).

The calibration process is optionally based on a set of one or more testing images and a set of one or more parameters. Optionally, the lenticular lens sheet is generated according to parameters which based on the parameters of the interlaced composite image. Optionally, a calibration process wherein a number of different lenticular lens sheets, each created according to different parameters, are provided and tested is held. Optionally, each set of parameters defines a different combination of lenticular article properties. For example, parameter sets include pairs created by selecting a colorCorrect parameter from the set {0.3, 0.6, ..., 1.8} and a parameter from the set {0, 0.1, 0.2, ..., 2.0}. In such a process, the parameters of the lenticular lens sheet which provides the most visually appealing outcomes are selected. As used herein, visually appealing outcomes are measured and/or weighted according to viewing parameters such as viewer identity, illumination, and versatile testing image sets.

It should be noted that the images, which are referred to herein, may be regions of another image, for example a region of an image that is selected to be interlaced for the creation of an interlaced composite image. For example, FIGS. 4A-4C respectively depict two exemplary received images having a region selected to be interlaced and an image having a reverse intensity region created therefrom. For brevity, a region of an image and an image may be referred to herein interchangeably.

Figure 4A:
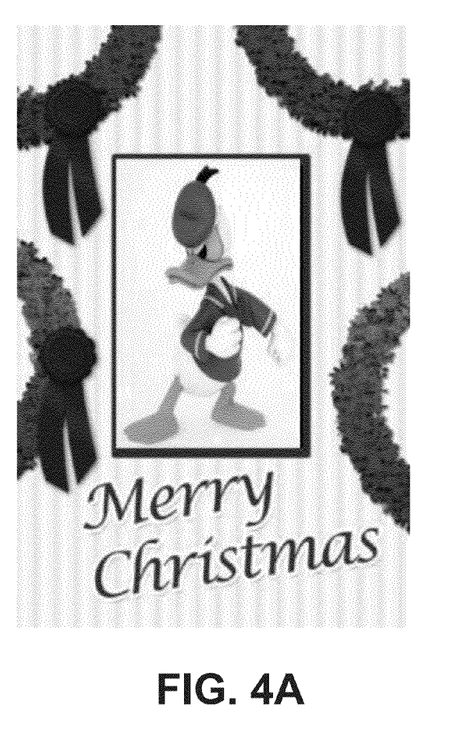
FIGS. 4A-4C respectively depict two exemplary received images having a region selected to be interlaced and an image having a reverse intensity region created therefrom.
Figure 4B:
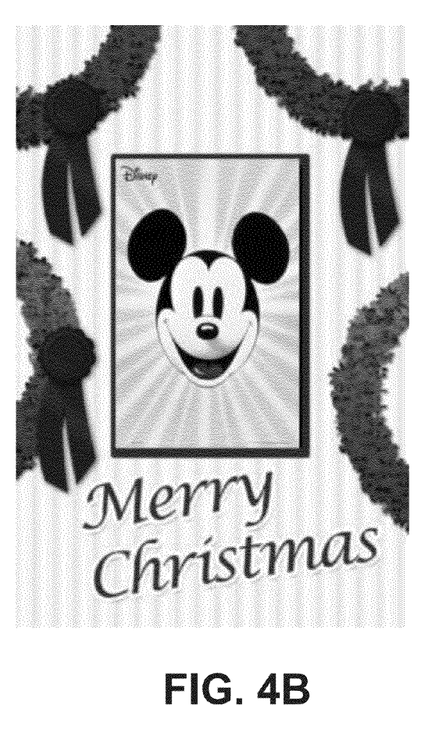
Figure 4C:
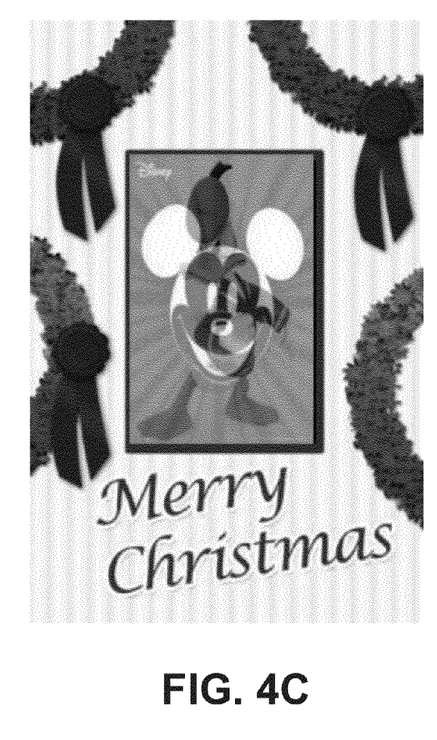

In such embodiments, certain areas are set without a lenticular effect. For example, as can be readily seen in FIG. 4C, while intensity within the region area, such as the area that depicts ears of the cartoon of FIG. 4A are reversed with respect to FIG. 4B, the intensity of pixel color values in other parts such as the "Merry Christmas" text, is not reversed.

In such embodiments, the separating strips are generated from the regions, which are selected to be interlaced for the creation of an interlaced composite image. Optionally, a lenticular article which combines a number of different lenticular effects, for example one or more areas which are designed to provide a 3D optical illusion and one or more areas which are designed to provide a flip optical illusion, is generated using the aforementioned method. In such embodiments, a separate interlaced composite image may be generated per area.

Reference is now made to an exemplary description of a process for creating the separating strips, according to some embodiments of the present invention.

In these embodiments, the separating strips are created from enhanced images. For brevity, $E_1, \ldots, E_k$ denotes enhanced images or regions of images (referred to herein as images) and R denotes a respective region of the enhanced images from which a reverse-intensity image, denoted herein as J, is created. The region may cover some or all of the area of the images. Optionally, J is a reverse-intensity image of image I over R where in R significant color transitions in image I appear at the same location but with reversed intensity in image J. By reversing the intensity of an image, a visible color transition from bright to dark is performed when crossing an object boundary in a given direction so that in image J there will be a visible boundary at the same location only that the color transition at the given direction will be from dark to bright.

Mathematically, a significant color transition G may be defined as an image gradient having a high magnitude (L2 norm), for example as follows:

$$G=\{x,y) \in R \mid \|\nabla I(x,y)\|_z > T\}$$

where $\nabla$ denotes a gradient operator and T denotes a threshold that is optionally defined to be high enough so as to ignore image noise gradients. For example, T is set to be 20% of the image values domain, for example if the received images are 8 bit images, T=51. The gradient operator is optionally a spatial derivative of a gray scale version of the image I, for example a grayscale image being an L channel of the Lab color space representation of the image. Gradient computation in images may be performed as known in the art, for example see U.S. Pat. No. 7,298,868 which is incorporated herein by reference.

Then, color transitions in images I, J at location (x, y) are reversed if $$<\nabla I(x,y), \nabla J(x,y)> < 0$$

where <,> denotes an inner product, in this case of the two spatial gradient vectors.

Figure 2A:
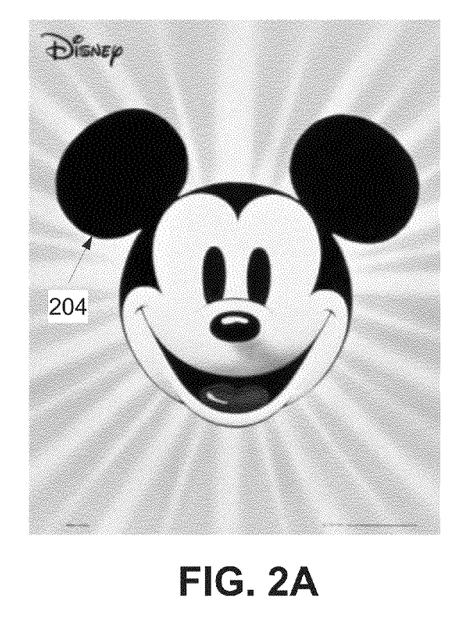
FIGS. 2A-2C respectively depict two exemplary received images and a reverse intensity image which is created according to some embodiments of the present invention.
Figure 2B:
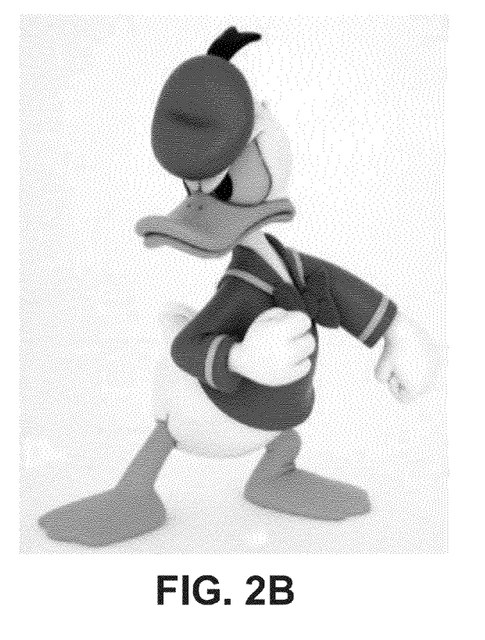
Figure 2C:
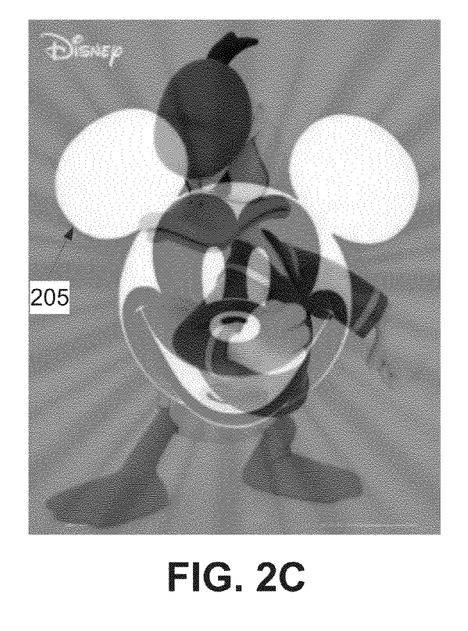

For example, each one of FIGS. 2A and 2B depicts two cartoons. In FIG. 2C a reverse intensity image of the image depicted in FIG. 2A appears over the entire image region wherein FIG. 2B is depicted. As can be seen, all color transitions of the image depicted in FIG. 2A appear reversed in FIG. 2C. For example, the transition from background up to cartoon's ear 204 is from bright to dark, and in the image depicted in FIG. 2C, at the same location 205, there is an apparent color transition up from dark to bright. In such embodiments, the reverse intensity image may depict bright color objects of a first image as dark objects and dark color objects depicted in the first image as light color objects. In such embodiments, the reverse intensity image may depict objects depicted in one of the interlaced composite images as a semi transparent overlay which is placed on top of another of the interlaced composite images.

Figure 3A:
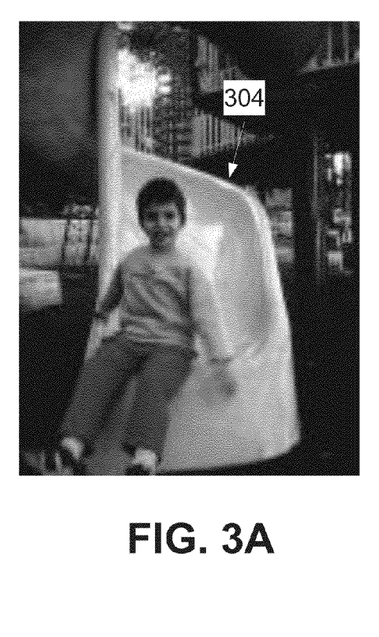
FIGS. 3A-3C respectively depict two other exemplary received images and another reverse intensity image which is created according to some embodiments of the present invention.
Figure 3B:
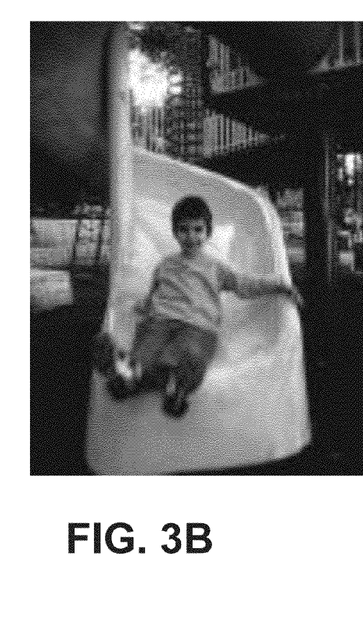
Figure 3C:
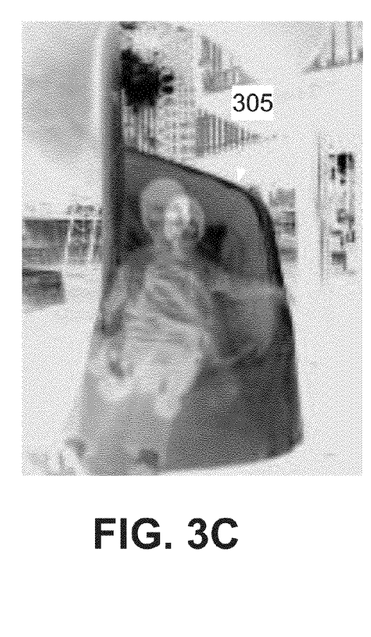

Another example is shown in FIGS. 3A-3C where the reverse intensity image depicted in FIG. 3C is a combination between a reverse intensity version of the image depicted in FIG. 3A and a reverse intensity version of the image depicted in FIG. 3B. As shown in FIG. 3B, the color transition at location 304 is from bright to dark and a respective location 305 in FIG. 3B has a color transition dark up to bright.

Optionally, the separating stripes are adapted to the properties of the received images and/or a selected image separating mask to which it is designed to be attached. For brevity, K denotes the number of enhanced images $(E_1, \ldots, E_k)$ which are received and V denotes a ratio between an interlacing resolution, optionally measured in dots per inch, and the pitch of the image separating mask, optionally measured in lenticular elements, such as slits or lenticular lens per inch is calculated.

Optionally, when V>=k*3, two separating stripes are added between each pair of views $E_h, E_{(h \mod k)+1}$, for example the following separating stripes:

$$S_{h1} = (1-\alpha)E_h + \alpha(1-E_{(h \mod k)+1})$$

$$S_{h2} = (1-\alpha)E_{(h \mod k)+1} + \alpha(1-E_h)$$

where mod denotes a modulus operator and h denotes an integer number between 1 and k, a denotes a scaling factor that may be calibrated as described below, and the images' color range is scaled between 0 and 1 (1 is an image whose values equal 1 at all pixels and all channels).

For example, in the images depicted in FIGS. 2A and 2B the separating stripes are added when two images are received for interlacing (k=2) and the interlacing resolution is 598 dots per inch (DPI) and the lens pitch was 59.8 lens per inch (LPI), and hence V=598/59.8=10 is bigger than 2*3. If $E_1$ denotes FIGS. 2A and $E_2$ denotes FIG. 2B, then FIG. 2C shows $S_{11}$ with $\alpha$=0.5.

Optionally, the space, which is allocated in the interlaced composite image for an image stripe, is different from the space, which is allocated to a separating stripe. For example, for creating a lenticular article from two images when V=10, a cycle of 10 images for interlacing is arranged as follows $E_1$, $E_1$, $E_1$, $S_{11}$, $S_{12}$, $E_2$, $E_2$, $E_2$, $S_{21}$, $S_{22}$. When the separating stripes are narrower than the imaging strips, the imaged effect of the lenticular imaging article is optionally more robust to illumination changes.

Optionally, when k*2<=V<k*3, a single separating strip is added between each pair of views $E_h, E_{(h \mod k)+1}$. The single separating strip is optionally defined as follows:

$$S_h = 1 - \alpha/2 + \alpha/4*(1-E_h) + \alpha/4*(1-E_{(h \mod k)+1})$$

For example, for creating a lenticular image, such as an animation flip of 5 images when V=10, a cycle of 10 images for interlacing is defined as follows:

$E_1, S_1, E_2, S_2, E_3, S_3, E_4, S_4, E_5, S_5$

Visual examples for such separating stripes are shown in FIG. 3C. In this example FIG. 3A is $E_1$ and FIG. 3B is $E_2$, so that FIG. 3C shows $S_1$ with $\alpha$=1.

Figure 5:
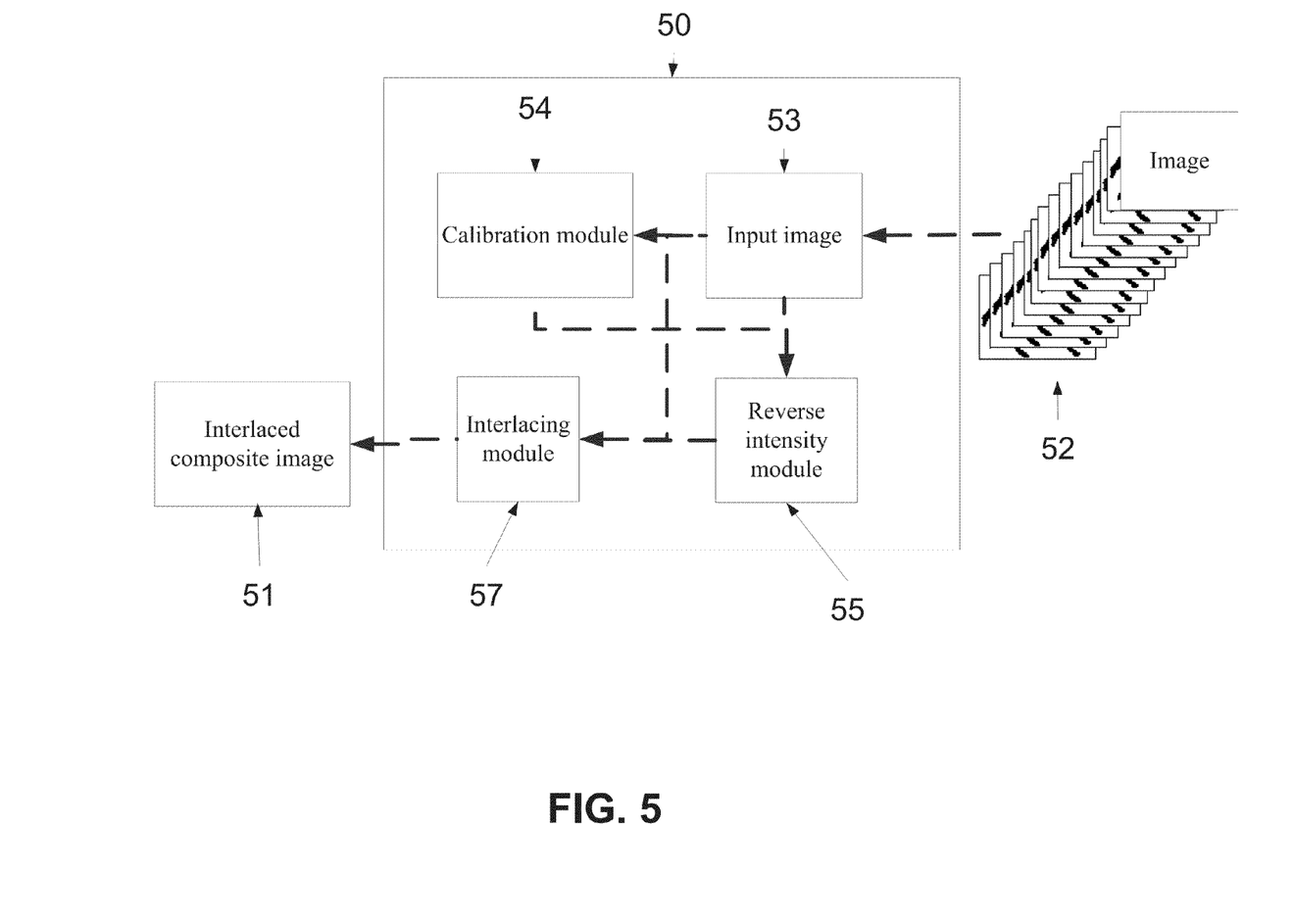
FIG. 5 is a schematic illustration of an apparatus for creating an interlaced composite image for a lenticular printing, according to some embodiment of the present invention.

Reference is now made to FIG. 5, which is a schematic illustration of an apparatus 50 for creating an interlaced composite image 51 for a lenticular printing, according to some embodiment of the present invention. The apparatus 50 comprises an input unit 53 that receives a number of images, optionally in a sequence 52, for example as described above. As used herein, a sequence means a typical spatial-temporal signal such as a series of sequentially ordered images, a video sequence, or any other series of sequential images. Optionally, the apparatus 50 comprises a calibration module 54 for defining and/or selecting one or more color enhancing and/or separating strips parameters, for example according to inputs which are received from the user of the apparatus and/or automatically according to characteristics of the received sequence 52 and/or the number of received images.

The sequence 52 and optionally the calibration parameters are forwarded to a reverse intensity module 55 that generates one or more reverse intensity images from the received images, for example as described above. The separating strips, together with the received images are forwarded to an interlacing module 57 that interlace the interlaced composite image 51 therefrom, for example as described above. The interlaced composite image may now be outputted, for example forwarded, by an outputting unit to a printing unit and/or to a 3D display unit, for example as described above. The outputting unit may be a network card and/or a display interface.

It is expected that during the life of a patent maturing from this application many relevant systems and methods will be developed and the scope of the term an image separating mask, a module, a server, a client terminal, and a printing system is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of creating an interlaced composite image, comprising:
   receiving a plurality of images selected for interlacing;
   creating a reverse intensity version of a first image from said plurality of images, said reverse intensity version of said first image depicting at least one bright color object of said first image as at least one dark color object and at least one dark color object of said first image as a bright color object;
   combining pixel color values of said reverse intensity version of said first image with respective pixel color values of at least a second image from said plurality of images to create at least one reverse intensity combination image, and
   extracting a plurality of separating strips from said at least one reverse intensity combination image;
   generating an interlaced composite image by interlacing a plurality of image strips from each image of said plurality of images and said plurality of separating strips in alternating manner; and
   outputting said interlaced composite image.

2. The method of claim 1, wherein said receiving further comprises enhancing pixel values of at least some of each of said plurality of images.

3. The method of claim 1, wherein said at least one reverse intensity combination image depicts objects depicted in said first image of said plurality of images as a semi transparent overlay which is placed on top of said second image of said plurality of images.

4. The method of claim 2, wherein said combining comprises subtracting a pixel value of each pixel in at least a portion of said first image of said plurality of images from an enhanced pixel value of a respective pixel in a respective portion of said second image from said plurality of images.

5. The method of claim 1, wherein said combining comprises subtracting at least a portion of a pixel value of each pixel in at least a portion of a said first image from a color enhanced pixel value of each pixel in a respective portion of said second image.

6. The method of claim 1, wherein said outputting comprises attaching said interlaced composite image to a lenticular lens sheet having a plurality of lenslets.

7. The method of claim 6, wherein a width of said plurality of lenslets is adapted to a width of at least one of said plurality of separating strips and said plurality of image strips.

8. The method of claim 1, wherein said plurality of images is a video sequence and said outputting is performed in real time for three dimensional display of said video sequence.

9. The method of claim 1, wherein said interlaced composite image is projected on a lenticular mask for three dimensional display of content depicted in said plurality of images.

10. The method of claim 1, wherein said outputting comprises at least one of printing said interlaced composite image and projecting said interlaced composite image on an image separating mask.

11. The method of claim 10, wherein a ratio between a space allocated for said plurality of separating strips and a space allocated for said plurality of image strips is adapted to a ratio between an interlacing resolution and a pitch of said image separating mask.

12. The method of claim 1, wherein each image of said plurality of images is taken from a region of a source image, said outputting comprises embedding said interlaced composite image in said region.

13. A non-transitory computer readable medium comprising computer executable instructions configured to perform the method of claim 1.

14. A lenticular imaging article with a reduced banding artifact, comprising:

a lenticular lens sheet having a plurality of lenslets; and
an interlaced composite image attached to said lenticular lens sheet and having a plurality of image strips from each of a plurality of images and a plurality of separating strips interlaced therebetween in alternating manner;
wherein at least some of pixel color values of each of said plurality of separating strips are extracted from at least one reverse intensity combination image created by combining pixel color values of a reverse intensity version of a first image from said plurality of images with respective pixel color values of at least a second image from said plurality of images;
wherein said reverse intensity version of said first image is created by depicting at least one bright color object of said first image as at least one dark color object and at least one dark color object of said first image as a bright color object.

15. A system of creating an interlaced composite image, comprising:

a memory storing code; and
a processor coupled to the memory for executing the stored code, the code comprising:
instructions to receive a plurality of images selected for interlacing;
instructions to create a reverse intensity version of a first image from said plurality of images, said reverse intensity version of said first image depicting at least one bright color object of said first image as at least one dark color object and at least one dark color object of said first image as a bright color object;
instructions to combine pixel color values of said reverse intensity version of said first image with respective pixel color values of at least a second image from said plurality of images to create at least one reverse intensity combination image, and
instructions to extract a plurality of separating strips from said at least one reverse intensity combination image;
instructions to generate an interlaced composite image by interlacing a plurality of image strips from each image of said plurality of images and said plurality of separating strips in alternating manner; and
instructions to output said interlaced composite image.

* * * * *